United States Patent [19]

Strelow et al.

[11] Patent Number: 5,786,418
[45] Date of Patent: Jul. 28, 1998

[54] HOT MELT ADHESIVE HAVING IMPROVED WET STRENGTH

[75] Inventors: Diane Strelow, Germantown; Mark Alper, Mukonaco, both of Wis.

[73] Assignee: Findley Adhesives, Inc., Wauwatosa, Wis.

[21] Appl. No.: 674,994

[22] Filed: Jul. 3, 1996

Related U.S. Application Data

[63] Continuation of Ser. No. 377,632, Jan. 25, 1995, abandoned.
[51] Int. Cl.⁶ .................. C08J 5/12; C08K 5/01; C08L 23/18
[52] U.S. Cl. .................. 524/579; 524/271; 524/274; 524/515
[58] Field of Search .................. 524/271, 274, 524/515, 579

[56] References Cited

U.S. PATENT DOCUMENTS

| | | | |
|---|---|---|---|
| 4,568,713 | 2/1986 | Hansen et al. | 524/291 |
| 4,833,192 | 5/1989 | Lakshmanan et al. | 524/476 |
| 4,937,138 | 6/1990 | Mostert | 428/286 |
| 5,106,447 | 4/1992 | Di Rado et al. | 156/334 |
| 5,254,612 | 10/1993 | Sugi et al. | 524/274 |

FOREIGN PATENT DOCUMENTS

WO92/12212   7/1992   WIPO.

*Primary Examiner*—Vasu Jagannathan
*Assistant Examiner*—U. K. Rajguru
*Attorney, Agent, or Firm*—Andrus, Sceales, Starke & Sawall

[57] ABSTRACT

A hot melt adhesive is described which possesses superior properties for the construction of disposal soft articles and more specifically disposable soft articles which may be exposed to moisture for prolonged periods of time. The adhesive composition includes about 10% to about 60% by weight of a butene-1-ethylene copolymer; about 20% to about 80% by weight of a tackifying resin; about 5% to about 30% by weight of a plasticizer; and about 0.1% to about 3% by weight of an antioxidant, wherein the ingredients total 100%, by weight, of the entire adhesive composition.

12 Claims, No Drawings

HOT MELT ADHESIVE HAVING IMPROVED WET STRENGTH

This application is a continuation of application Ser. No. 08/377,632 filed Jan. 25, 1995, now abandoned.

BACKGROUND OF THE INVENTION

The present invention relates to hot melt adhesives which exhibit improved open-times, and more specifically to hot melt adhesives having improved wet strength properties and which find usefulness in the manufacture of disposable nonwoven garments.

DESCRIPTION OF THE PRIOR ART

The prior art is replete with numerous examples of hot melt adhesives which are employed for the construction of disposable soft goods. Specific applications for these prior art adhesives have included disposable diapers, sanitary napkins, surgical drapes, hospital pads and adult incontinence products to name but a few. Moreover the prior art methods of application of these prior art adhesives have, included but are not limited to extrusion [multi-bead or slot] and spray or wheel application systems.

Those skilled in the art will readily recognize that many different polymers have been used in adhesives employed in the construction of disposable soft goods. In this regard typical hot melt adhesives have employed polymers which have included S-I-S [styrene-isoprene-styrene]; SBS [styrene-butadiene-styrene]; SEBS [styrene-ethylene-butylene-styrene]; EVA [ethylene vinyl acetate]; and APAO [amorphous poly alpha olefin]. While these polymers, when properly blended provide acceptable adhesion to most substrates employed in typical diaper construction, and further provide acceptable adhesion under dry conditions, they have had several shortcomings which have detracted from their usefulness.

One of the most noteworthy shortcomings of the prior art adhesives concerns the manner in which the adhesive reacts when exposed to liquids, such as water, urine, or the like. For example, when the prior art adhesives are applied to polyolefin substrates [such as polyethylene, polypropylene or nonwoven substrates, as the case may be], almost all adhesives will give good dry bonds and will normally maintain an acceptable bond strength when wet. However, when substrates such as tissue or core fluff are used, certain problems present themselves. For example, while many of the adhesives formulated with the polymers, noted above, will give excellent dry bond strengths, these same adhesive bonds appear to be easily broken when the substrates are exposed to water, urine, or other water-based discharges or solutions. This bond delamination of the various substrates can cause the fluff core to sag, and further results in a poor fit, absorption problems and leaking of the garment especially when the garment is of the type which includes disposable diapers, or incontinence products.

More recently, manufacturers of disposable nonwoven garments such as diapers have endeavored to produce products which are much thinner in their overall thickness and profile and which incorporate super absorbent materials in place of the fluff, which is normally in the core. In this regard, it should be understood that the nonwoven fibers comprise long wood pulp fibers which are interwoven together to form a given mass. In contrast, super absorbent material includes small sphere shaped particles which are not connected together to form a coherent mass like the nonwoven material. Therefore, core integrity becomes an even more important issue with these thinner garments. Therefore, it has long been known that it would be desirable to have a hot melt adhesive which is useful for bonding to substrates which are typically employed in the construction of nonwoven garments, such as polyethylene; polypropylene; nonwoven; tissue; or fluff and which further maintains acceptable bond strength with the above identified substrates following exposure of same for prolonged periods of time to water, urine or similar materials, and which further is substantially nonblocking under normal storage, and usage conditions.

OBJECTS AND SUMMARY OF THE INVENTION

It is therefore an object of the present invention to provide an improved hot melt adhesive which is useful for the manufacture of disposable soft goods.

A further object of the present invention is to provide a hot melt adhesive which can be employed as a construction adhesive, and which further can be applied by employing extrusion, or spray techniques to at least one polyolefin, or nonwoven substrate and at least one polyethylene, polypropylene, nonwoven, tissue or fluff.

Another object of the present invention is to provide a hot melt adhesive which has the following preferred composition:

about 25%, by weight, of a butene-1-ethylene copolymer;
about 50%, by weight, of a tackifying resin;
about 25%, by weight, of a plasticizer; and
about 0.1 to about 3%, by weight, of a hindered phenolic antioxidant, and wherein the hot melt adhesive composition displays an improved open-time and room temperature flow properties, and further has a viscosity of about 2,000 cP at 325° F., and a melting point of about 170° F.to about 200° F.

Another object of the present invention is to provide an adhesive composition which, when applied to a tissue laminate in an amount equal to about 3 milligrams per square inch and at a temperature of about 300° F., and further with an open time of about 1 second, produces a peel strength, when measured by utilizing a dry Instron peel strength evaluation, of about 100 grams.

Another object of the present invention is to provide a hot melt adhesive composition and wherein the adhesive composition is substantially nonblocking under normal storage conditions, and further when applied to a nonwoven, and tissue substrate in an amount which is equal to about 2 milligrams per square inch, and at a temperature of about 300° F., forms a bond which has an average peel strength of about 50 grams following exposure to water for at least one hour duration.

Another object of the present invention is to provide a hot melt adhesive composition which utilizes a butene-1-ethylene copolymer, and wherein the adhesive composition possesses an excellent balance of high specific adhesion, elevated temperature resistance and acceptable viscosity during normal application temperatures.

Further objects and advantages of the present invention are to provide a hot melt adhesive composition for the purposes described, and which is durable, easy to apply utilizing conventional manufacturing techniques; and which further does not have the numerous shortcomings attributable to the prior art adhesives used for substantially identical purposes heretofore.

DESCRIPTION OF THE PREFERRED EMBODIMENT

The preferred adhesive composition of the present invention includes:

about 10% to about 60%, by weight, of a butene-1-ethylene copolymer;

about 20% to about 80%, by weight, of a tackifying resin;

about 5% to about 30%, by weight, of a plasticizer; and about 0.1% to about 3%, by weight, of an antioxidant, and wherein the hot melt adhesive composition has a viscosity of about 1,000 to about 50,000 cP at 325° F., and a melting point of about 170° F.–200° F.

Butene-1-homopolymers and copolymers which are useful in the present invention are primarily linear chain molecules with regular and spatially ordered arrangements of ethyl side groups. These side groups are the result when butene-1 is polymerized across the 1, 2, carbon double bond, and along an ethylene chain backbone. This is described in further detail in U.S. Pat. No. 3,362,940. When cooled from a melt, the ethyl side groups initially align in a tetragonal spatial arrangement. With time the tetragonal crystalline phase form transfers into a stable hexagonal spatial arrangement with a subsequent development of improved physical properties. A more thorough discussion of the polymer utilized herein may be found in the reference to Mostert, U.S. Pat. No. 4,937,138, the contents of which is incorporated by reference herein. As will be seen from the disclosure above, the present polymer is useful in amounts of about 10% to about 60%, by weight.

A suitable commercially available butene-1-ethylene copolymer can be secured from Shell Chemical Company of Houston, Texas under the tradename Duraflex 8910 PC.

As noted above, tackifying resins which are useful within the scope of the present invention have a weight of about 20% to about 80%, by weight. The tackifying resins can be selected from any of the nonpolar types, which are commercially available. An example of a commercially available tackifying resin which is useful for the present invention includes the resin which is identified commercially by the trade designation Escorez 1310 LC and which is manufactured by Exxon Chemical Company. Normally, nonpolar tackifying resins which are useful with the present invention include resins which have partially, or completely hydrogenated $C_9$ or $C_5$ based hydrocarbon resins with softening points that are in a range of approximately 70° C. to approximately 125° C. Tackifying resins which are useful for the present invention can perhaps include polar tackifying resins, however, the choice of available polar tackifying resins is limited in view of the fact that many of the polar resins appear only partially compatible with the butene-1-homopolymer, and copolymers. As noted above, the tackifying resin selected which is useful with the present invention will be about 20% to about 80%, by weight, of the entire adhesive composition and more preferably about 50% thereof.

The plasticizer that finds usefulness in the present invention can be any number of different plasticizers but the inventors have discovered that a plasticizer which includes a polybutene mono-olefin polymer such as what is commercially available under the trade designation Indopol H-100, and which is manufactured by Amoco, is particularly useful in the present invention. As will be appreciated, plasticizers have typically been employed to lower the viscosity of the overall adhesive composition without substantially decreasing the adhesive strength and/or the service temperature of the adhesive. As noted above, the present adhesive composition has a viscosity of about 2,000 cP to about 50,000 cP at 325° F., and a melting point of about 170° F. to about 200° F. In view of the unexpectedly favorable viscosities, the adhesive composition of the present invention has improved spraying characteristics when employed with conventional manufacturing equipment.

As earlier discussed, the hot melt adhesive composition of the present invention includes about 0.1% to about 3%, by weight, of an antioxidant. As a general matter it is understood that antioxidants and stabilizers are important to protect the otherwise vulnerable copolymer and thereby the adhesive composition from the deleterious effects of thermal and oxidative degradation which is frequently experienced during the manufacture and application of adhesive compounds as well as in the ordinary use of the final product. It should be understood that this degradation usually manifests itself by the deterioration of the adhesive composition in appearance, physical properties and performance. Among the most useful stabilizers are high molecular weight hindered phenols, and multifunctional phenols, such as sulfur, and phosphorous-contain phenols. In this regard, hindered phenols are well known to those skilled in the art, and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl groups. The presence of the sterically bulky substituted radicals in the vicinity of the hydroxyl group is believed to retard its stretching frequency and correspondingly its reactivity. This steric hindrance is believed to provide the phenolic compounds with its stabilizing properties.

A suitable antioxidant for use with the present invention is commercially available from CIBA-GEIGY Company under the tradename Igranox 1010.

The performance of these stabilizers are well known in the art and may be further enhanced by utilizing in conjunction therewith, synergists such as for example, thiodipropionate esters and phosphites; and chelating agents and metal deactivators, such as, for example, ethylenediaminetetraacetic acid, salts thereof and disalicylalpropylenediimine.

The hot melt adhesive composition of the present invention may be formulated using any of the techniques known in the art. A representative example of the prior art procedure involves placing all of the plasticizer and stabilizer in a jacketed mixing kettle, and preferably in a jacketed heavy duty mixer of the Baker-Perkins or Day type and which is equipped with rotors and thereafter raising the temperature of this mixture to a range of about 250° to about 350° F. It should be understood that the precise temperature to be used in this step will depend upon the melting point of the particular ingredients. When the initial mixture, noted above, has been heated, the mixture is blanketed in carbon dioxide at a slow flow rate, and the resin described above is slowly added. When the resin is melted, and the desired temperature is reached, the copolymer is added to the mixture. The resultant adhesive composition mixture is then agitated until the copolymer is completely dissolved. A vacuum is then applied to the mixture to remove any entrapped air.

Optional additives may be incorporated into the hot melt construction adhesive composition in order to modify particular physical properties. These additives may include colorants, such as titanium dioxide and fillers such as talc and clay. However, these additional additives do not include nucleating agents such as those that are described in U.S. Pat. No. 4,937,138 to Mostert, in view of the undesirable effects imparted to the adhesive composition when these nucleating agents are added to same.

The invention is further illustrated by way of the examples noted below. In this regard, an adhesive composition in accordance with the teachings of the present invention was made by the general procedure described above. This adhesive composition had the following constituent elements:

about 25%, by weight, of a butene-1-ethylene copolymer;

about 50%, by weight, of a tackifying resin;

about 25%, by weight, of a plasticizer; and about 0.1% to about 3%, by weight, of a hindered phenolic antioxidant and wherein the hot melted adhesive composition following application displayed an improved open time, and room temperature flow properties, and further had a viscosity of about 2,000 cP at 325° F., and a melting point of about 170° F.

More specifically, butene-1-ethylene copolymer was commercially secured from Shell Chemical Company under the tradename Duraflex 8910-PC; the tackifying resin was commercially secured from Exxon Chemical Company under the tradename Escorez 1310 LC; the plasticizer was commercially secured from Amoco Chemical Company under the trade designation Indopol H-100; and the antioxidant was commercially secured under the trade designation Irganox 1010 from the CEBA-GEIGY.

The resulting hot melt adhesive composition, upon testing, was found useful for a multibead or multiline construction of nonwoven garments. Further it was sprayed and extruded on various substrates and found to be generally acceptable for all intended purposes. The specific performance characteristics of this preferred formulation and the examples which follow are discussed in greater detail hereinafter.

A second example of the adhesive composition was formulated and had the following characteristics:

about 40%, by weight, of a butene-1-ethylene copolymer;

about 40%, by weight, of a tackifying resin;

about 20%, by weight, of a plasticizer, and about 1%, by weight, of a hindered phenolic antioxidant, and wherein the adhesive composition has a viscosity of about 4000 cP at a temperature of about 325° F. and a melting point of about 180° F.

A third example of the adhesive composition was formulated and had the following characteristics:

about 50%, by weight, of a butene-1-ethylene copolymer;

about 30%, by weight, of a tackifying resin;

about 20%, by weight, of a plasticizer; and about 1%, by weight, of a hindered phenolic antioxidant, and wherein the adhesive composition has a viscosity of about 5500 cP at a temperature of about 325° F. and a melting point of about 188° F.

A fourth example of the adhesive composition was formulated and had the following characteristics:

about 25%, by weight, of a butene-1-ethylene copolymer;

about 65%, by weight, of a tackyifying resin;

about 10%, by weight, of a plasticizer; and about 1%, by weight, of a hindered phenolic antioxidant, and wherein the adhesive composition has a viscosity of about 1500 cP at 325° F. and a melting point of about 173° F.

In each of the examples, noted above, it was found that adhesives formulated in accordance with these examples were useful for constructing nonwoven, disposable soft goods.

As noted earlier, traditional hot melt adhesives which have been formulated using SIS, SBS, SEBS and APAO have a propensity when exposed to water for prolonged periods of time, to lose their bond strengths, with the result that laminations prepared with such adhesives will fail when exposed for prolonged periods of time to water.

As should be understood, such delaminations, of a nonwoven garment, such as a diaper or the like may cause the garment's core integrity to fail with resulting undesirable effects such as leaking or poor fit.

In order to demonstrate the novel and unexpected results achieved by the present invention, the inventors compared and contrasted the adhesive compositions of the present invention with the prior art adhesive compositions which have been commercially available for some time and which further utilize the polymers, such as SIS, SBS, SEBS, and APAO, as noted above. For example, the prior art adhesive compositions were applied in an amount equal to about approximately three milligrams per square inch and at a temperature of 300° F., and further with an open time of about 0.5 seconds to form a tissue laminate. It was discovered that the present adhesive, when measured by a dry instron peel strength evaluation, under similar coating conditions, produced a bond strength of approximately 100 grams, this bond strength being comparable to more traditional adhesive compositions. However, when the same adhesive composition was compared to the more traditional adhesives following a one hour soak in tap water, it was discovered that the traditional adhesives, as noted above, produced bond strengths in the range of approximately 5 to about 25 grams. In contrast, adhesives manufactured in accordance with the teaching of the present invention produced bond strengths in excess of 50 grams thereby making them a very attractive adhesive for use in constructing a nonwoven garment, and more specifically a diaper which may be exposed to water for prolonged periods of time.

The present composition was further tested by means of applying it to a nonwoven, and tissue substrate to form a laminate. The adhesive was applied in an amount equal to about 2 milligrams per square inch and at a temperature of about 300° F. and further with an open time of about 1.0 second. Following formation of the laminate, it was submerged in water for approximately one hour. Following submersion, the peel strength of the adhesive was tested in a manner similar to that which was discussed above. The test results demonstrated that the lamination had an average peel strength of about 50 grams following exposure to water for one hour. Traditional adhesive compositions displayed greatly reduced bond strengths along the ranges noted above. What was surprising, however, was the percentage of bond strength retained. For example, a standard adhesive and which may be secured from Findley Adhesives, had a bond strength following a soak of one hour of about 5.7 grams which represents about 2% of its dry bond strength. In contrast, the adhesive of the present invention, following a one hour soak retained a bond strength of about 56.6 grams, which represents approximately 36% of its dry bond strength.

In all the tests noted above, the peel strengths were measured at a rate of 12 inches per minute. Further, five samples were tested in each instance.

In addition to the foregoing, the adhesive composition of the present invention has a low viscosity, and melting point, which makes this a very desirable adhesive for use with the more traditional application methods.

Therefore, it will be seen that the hot melt adhesive of the present invention provides a fully dependable and practical means for adhesively assembling a disposable soft good such as a disposable diaper, feminine napkin or the like, and which further avoids the detriments associated with the prior art practices which includes, among others, employing several different adhesive compositions for assembling a disposable soft good. In addition to the foregoing, the improved hot melt adhesive of the present invention shows surprising and unusually desirable manufacturing viscosities when compared with the prior art, and further has peel strengths, following exposure to water which are greatly improved in relative comparison to the prior art.

It will be apparent to those skilled in the art that the foregoing example has been made for the purpose of illustration and that variations may be made in the proportions, procedures, and material without departing from the scope of the present invention. Therefore, it is to be understood that this invention not be limited except by the claims which follow:

What we claim as new and desire to secure by Letters Patent is:

1. A hot melt adhesive composition having improved wet strength characteristics comprising a formulation having the following ingredients: about 10% to about 60%, by weight, of a butene-1-ethylene copolymer;

about 20% to about 80%, by weight, of a tackifiing resin;

about 5% to about 30%, by weight, of a plasticizer having a molecular weight less than about 1000; and about 0.1% to about 3%, by weight, of an antioxidant, wherein the ingredients total 100%, by weight, based on the weight of the entire adhesive composition, and wherein the hot melt adhesive composition has a viscosity of about 1,000 to about 50,000 cP at 325° F. and a melting point of about 170° F. to about 200° F., and further wherein the adhesive composition, when applied to one substrate of a tissue laminate, said tissue laminate composed of a first substrate and a second tissue substrate, in an amount of about 3.0 mg/in$^2$ and at a temperature of 300° F., and with an open time between application of said adhesive composition to said one substrate and contact with the second substrate of about 0.5 second, produces an average peel strength of between at least about 50 grams and up to failure of either said first substrate or said second tissue substrate following exposure to water for a period of about 1 hour.

2. A hot melt adhesive composition as claimed in claim 1, and wherein the hot melt adhesive will bind to a polyethylene, polypropylene, absorbent core, and nonwoven top sheet or tissue of a disposable article and further has a propensity to flow into the fibers of the absorbent core or tissue thereby establishing a mechanical bond which resists degradation when exposed to a solution which includes water.

3. A hot melt adhesive composition as claimed in claim 2, and wherein the tackifying resin is at least partially compatible with the butene-1-ethylene copolymer, and the antioxidant is a hindered phenolic antioxidant.

4. A hot melt adhesive composition as claimed in claim 3, and wherein the plasticizer includes a mono-olefin polymer, and the hot melt adhesive composition has a relatively long open-time, and remains substantially non-blocking when exposed to elevated temperatures.

5. A hot melt adhesive composition comprising a formulation having the following ingredients:

about 25%, by weight, of a butene-1-ethylene copolymer;

about 50%, by weight, of a tackifying resin;

about 25%, by weight, of a low molecular weight plasticizer having a molecular weight less than about 1000; and about 0.1 to about 3%, by weight, of hindered phenolic antioxidant, wherein the ingredients total 100%, by weight, based on the weight of the entire adhesive composition, and wherein the adhesive composition has a viscosity of about 2000 cP at 325° F., and a melting point of about 170° F., and further wherein the adhesive composition, when applied to one substrate of a tissue laminate, said tissue laminate composed of a first substrate and a second tissue substrate, in an amount of about 3.0 mg/in$^2$ and at a temperature of 300° F., and with an open time between application of said adhesive composition to said one substrate and contact with the second substrate of about 0.5 second, produces an average peel strength of between at least about 50 grams and up to failure of either said first substrate or said second tissue substrate following exposure to water for a period of about 1 hour.

6. A hot melt adhesive composition as claimed in claim 5, and wherein the adhesive composition, when applied to a tissue laminate, in an amount of about 3.0 mg/in$^2$ and at a temperature of 300° F., and with an open time of about 1 second, produces a peel strength of about 100 grams.

7. A hot melt adhesive composition as claimed in claim 6, and wherein the adhesive composition is substantially non-blocking under normal storage conditions.

8. A hot melt adhesive composition as claimed in claim 7, and wherein to the tackifying resin is at least partially compatible with the butene-1-ethylene copolymer, and the plasticizer includes mono-olefin polymers.

9. A hot melt adhesive composition having improved wet strength characteristics consisting essentially of a formulation having the following ingredients:

about 10% to about 60%, by weight, of a butene-1-ethylene copolymer;

about 20% to about 80%, by weight, of a tackifying resin;

about 5% to about 30%, by weight, of a plasticizer having a molecular weight less than about 1000; and about 0.1% to about 3%, by weight, of an antioxidant, wherein the ingredients total 100%, by weight, based on the weight of the entire adhesive composition and wherein the hot melt adhesive composition has a viscosity of about 1,000 cP to about 50,000 cP at a temperature of 325° F. and a melting point of about 170° F. to about 200° F., and further wherein the adhesive composition, when applied to one substrate of a tissue laminate, said tissue laminate composed of a first substrate and a second tissue substrate, in an amount of about 3.0 mg/in$^2$ and at a temperature of 300° F., and with an open time between application of said adhesive composition to said one substrate and contact with the second substrate of about 0.5 second, produces an average peel strength of between at least about 50 grams and up to failure of either said first substrate or said second tissue substrate following exposure to water for a period of about 1 hour.

10. A hot melt adhesive composition as claimed in claim 1 wherein said low molecular weight plasticizer is polybutene.

11. A hot melt adhesive composition as claimed in claim 5 wherein said low molecular weight plasticizer is polybutene.

12. A hot melt adhesive composition as claimed in claim 9 wherein said low molecular weight plasticizer is polybutene.

* * * * *